(12) United States Patent
Yu

(10) Patent No.: US 12,111,991 B2
(45) Date of Patent: Oct. 8, 2024

(54) DISPLAY MODULE AND DISPLAY TERMINAL

(71) Applicant: Wuhan China Star Optoelectronics Semiconductor Display Technology Co., Ltd., Hubei (CN)

(72) Inventor: Xueying Yu, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/623,619

(22) PCT Filed: Dec. 20, 2021

(86) PCT No.: PCT/CN2021/139753
§ 371 (c)(1),
(2) Date: Dec. 29, 2021

(87) PCT Pub. No.: WO2023/103074
PCT Pub. Date: Jun. 15, 2023

(65) Prior Publication Data
US 2024/0036671 A1 Feb. 1, 2024

(30) Foreign Application Priority Data
Dec. 9, 2021 (CN) .......................... 202111498686.8

(51) Int. Cl.
*G06F 3/041* (2006.01)
(52) U.S. Cl.
CPC .. *G06F 3/0412* (2013.01); *G06F 2203/04102* (2013.01)

(58) Field of Classification Search
None
See application file for complete search history.

(56) References Cited

U.S. PATENT DOCUMENTS

2019/0012031 A1* 1/2019 Kim ...................... H10K 59/38

FOREIGN PATENT DOCUMENTS

| CN | 110286794 | 9/2019 |
| CN | 112667106 | 4/2021 |
| CN | 112711347 | 4/2021 |

(Continued)

OTHER PUBLICATIONS

International Search Report and the Written Opinion Dated Jul. 27, 2022 From the International Searching Authority Re. Application No. PCT/CN2021/139753 and Its Translation Into English. (17 Pages).

(Continued)

*Primary Examiner* — Brian M Butcher

(57) ABSTRACT

A display module and a display terminal are provided in the present application. The display module includes a display region, a bending region, and a binding region, and the bending region is located between the display region and the binding region. The display module includes a display panel and a touch layer. The touch layer is located on a light emitting side of the display panel, wherein the touch layer includes a plurality of touch traces, and the plurality of touch traces extend form the display region to the bending region, and the plurality of touch traces extend across the bending region to the binding region.

10 Claims, 3 Drawing Sheets

(56) References Cited

FOREIGN PATENT DOCUMENTS

| CN | 113342209 | 9/2021 |
|----|-----------|--------|
| CN | 113433731 | 9/2021 |
| CN | 113515205 | 10/2021 |
| KR | 10-2020-0048669 | 5/2020 |

OTHER PUBLICATIONS

Notification of Office Action and Search Report Dated May 24, 2023 From the State Intellectual Property Office of the People's Republic of China Re. Application No. 202111498686.8 and Its Translation Into English. (15 Pages).

* cited by examiner

DISPLAY MODULE AND DISPLAY TERMINAL

RELATED APPLICATIONS

This application is a National Phase of PCT Patent Application No. PCT/CN2021/139753 having International filing date of Dec. 20, 2021, which claims the benefit of priority of Chinese Patent Application No. 202111498686.8 filed on Dec. 9, 2021. The contents of the above applications are all incorporated by reference as if fully set forth herein in their entirety.

FIELD AND BACKGROUND OF THE INVENTION

The present disclosure relates to the field of display technologies, and more particularly, to a display module and a display terminal.

Since the development of display technology, the side where the driver chips, flexible circuit boards, and other driver devices are located still occupies a large border space. In order to increase the screen-to-body ratio, when designing a display panel, most of them choose to bend the side where the driving device such as the driving chip and the flexible circuit board are located to the back of the display panel, so as to achieve a narrow border. This design inevitably forms a bending region. Due to the particularity of the bending region, the traditional trace design generally implements jumping on both sides of the bending region. The traces are switched to the neutral layer to prevent the traces from breaking. However, when the demand for display functions is increasing, the number of film layers is increasing, and the border size is reducing, the risk of implementing jumping by punching holes on both sides of the bending region is also increasing.

In the exist technology, the touch layer is usually disposed on the encapsulation layer, and the jumping of the touch traces is implemented through the jumping holes on both sided of the bending region. In the bending region, the jumping of traces is implemented by using the array layer. In the non-bending region, the jumping of the traces is implemented by using the touch layer. In this design, first, the touch traces in the touch layer are jumped to the array layer through the jumping holes, and then the touch traces in the array layer are jumped to the touch layer through other jumping holes. The position and the size of the jumping hole will affect the encapsulating performance of the display region and the conduction of signal. Under the design trend of narrowing border, the encapsulation layer inevitably covers the jumping holes on the side of display region adjacent to the bending region. That results the jumping performance is undesirable, and it is hard to take into account the encapsulating performance and the conduction performance at this location. Therefore, it is necessary to improve this defect.

Technical Problems

The embodiment of the present application provides a display module to solve the technical problem that the jumping of the touch traces is implemented through the jumping holes in the bending region which results the encapsulating performance and the conduction performance of signal cannot be taken into account, in the exist technology.

SUMMARY OF THE INVENTION

Technical Solutions

The embodiment of the present application provides a display module, including a display region, a bending region, and a binding region. The bending region is located between the display region and the binding region. The display module includes a display panel and a touch layer. The touch layer is located on a light emitting side of the display panel, wherein the touch layer includes a plurality of touch traces, and the plurality of touch traces extend form the display region to the bending region, and the plurality of touch traces extend across the bending region to the binding region.

In the display module provided by the embodiment of the present application, in the bending region, the display panel includes a flexible substrate and a group of organic film layers, the group of organic film layers is located on the flexible substrate; wherein the plurality of touch traces are located on the group of organic film layers, and a side of the plurality of touch traces being away from the group of organic film layers is covered by a protective layer.

In the display module provided by the embodiment of the present application, the protective layer includes a plurality of protective sub-layers, and one of the plurality of protective sub-layers correspondingly covers one of the plurality of touch traces.

In the display module provided by the embodiment of the present application, the display module further includes an encapsulation layer located in the display region, and the encapsulation layer is located between the display panel and the touch layer; wherein in a top-view direction of the display module, a width of the touch trace located on a side of the encapsulation layer adjacent to the bending region is greater than a width of the touch trace located on the encapsulation layer.

In the display module provided by the embodiment of the present application, the display module further includes an encapsulation layer located in the display region, and the encapsulation layer is located between the display panel and the touch layer; wherein an elevation layer is disposed on a side of the encapsulation layer adjacent to the bending region, a side of the elevation layer adjacent to the touch layer has a buffer structure, one end the buffer structure is in contact with a side surface of the encapsulation layer away from the display panel, and another end of the buffer structure is in contact with a surface of the group of organic film layers away from the flexible substrate.

In the display module provided by the embodiment of the present application, the elevation layer is made of a non-conductive material.

In the display module provided by the embodiment of the present application, the elevation layer is made of a conductive material, and the elevation layer includes a plurality of elevation portions arranged in insulation, and one of the plurality of elevation portions is corresponding to one of the plurality of touch traces.

In the display module provided by the embodiment of the present application, the plurality of touch traces include a plurality of first touch traces and a plurality of second touch traces, and the plurality of first touch traces and the plurality of second touch traces are disposed in different layers.

In the display module provided by the embodiment of the present application, in the bending region, each of the plurality of first touch traces is located between the adjacent two second touch traces, and each of the plurality of second touch traces is located between the adjacent two first touch traces.

In the display module provided by the embodiment of the present application, in the bending region, an insulating layer is disposed between the plurality of first touch traces and the plurality of second touch traces, and the plurality of first touch traces are located between the display panel and the plurality of the second touch traces; wherein a side of the insulating layer away from the plurality of first touch traces has a plurality of grooves, and the plurality of second touch traces are respectively disposed in the plurality of grooves.

The embodiment of the present application further provides a display terminal, including a terminal body and a display module. The terminal body and the display module are combined into one body. The display module includes a display region, a bending region, and a binding region, and the bending region is located between the display region and the binding region. The display module includes a display panel and a touch layer. The touch layer is located on a light emitting side of the display panel, wherein the touch layer includes a plurality of touch traces, and the plurality of touch traces extend form the display region to the bending region, and the plurality of touch traces extend across the bending region to the binding region.

In the display module provided by the embodiment of the present application, in the bending region, the display panel includes a flexible substrate and a group of organic film layers, the group of organic film layers is located on the flexible substrate; wherein the plurality of touch traces are located on the group of organic film layers, and a side of the plurality of touch traces being away from the group of organic film layers is covered by a protective layer.

In the display module provided by the embodiment of the present application, the protective layer includes a plurality of protective sub-layers, and one of the plurality of protective sub-layers correspondingly covers one of the plurality of touch traces.

In the display module provided by the embodiment of the present application, the display module further includes an encapsulation layer located in the display region, and the encapsulation layer is located between the display panel and the touch layer; wherein in a top-view direction of the display module, a width of the touch trace located on a side of the encapsulation layer adjacent to the bending region is greater than a width of the touch trace located on the encapsulation layer.

In the display module provided by the embodiment of the present application, the display module further includes an encapsulation layer located in the display region, and the encapsulation layer is located between the display panel and the touch layer; wherein an elevation layer is disposed on a side of the encapsulation layer adjacent to the bending region, a side of the elevation layer adjacent to the touch layer has a buffer structure, one end the buffer structure is in contact with a side surface of the encapsulation layer away from the display panel, and another end of the buffer structure is in contact with a surface of the group of organic film layers away from the flexible substrate.

In the display module provided by the embodiment of the present application, the elevation layer is made of a non-conductive material.

In the display module provided by the embodiment of the present application, the elevation layer is made of a conductive material, and the elevation layer includes a plurality of elevation portions arranged in insulation, and one of the plurality of elevation portions is corresponding to one of the plurality of touch traces.

In the display module provided by the embodiment of the present application, the plurality of touch traces include a plurality of first touch traces and a plurality of second touch traces, and the plurality of first touch traces and the plurality of second touch traces are disposed in different layers.

In the display module provided by the embodiment of the present application, in the bending region, each of the plurality of first touch traces is located between the adjacent two second touch traces, and each of the plurality of second touch traces is located between the adjacent two first touch traces.

In the display module provided by the embodiment of the present application, in the bending region, an insulating layer is disposed between the plurality of first touch traces and the plurality of second touch traces, and the plurality of first touch traces are located between the display panel and the plurality of the second touch traces; wherein a side of the insulating layer away from the plurality of first touch traces has a plurality of grooves, and the plurality of second touch traces are respectively disposed in the plurality of grooves.

Beneficial Effect

The embodiment of the present application provides a display module including a display region, a bending region, and a binding region, and the bending region is located between the display region and the binding region. The display module includes a display panel and a touch layer. The touch layer is located on a light emitting side of the display panel, wherein the touch layer includes a plurality of touch traces, and the plurality of touch traces extend form the display region to the bending region, and the plurality of touch traces extend across the bending region to the binding region. In the present application, the jumping holes are canceled, the jumping of the touch traces is not implemented in the bending region, the touch traces directly extend form the display region to the bending region, and the touch traces extend across the bending region to the binding region, which prevent a poor jumping performance causing from the jumping holes be covered by the encapsulation layer. In addition, the encapsulation reliability can be enhanced, and the process difficulty can be reduced. Moreover, the encapsulation layer can be disposed further adjacent to the bending region, regardless of the conduction problem of the jumping holes, thereby increasing the screen-to-body ratio and realizing a narrow border design.

BRIEF DESCRIPTION OF THE SEVERAL VIEWS OF THE DRAWINGS

In order to more clearly describe the technical solutions in the embodiments of the present application, the following will briefly introduce the drawings needed in the description of the embodiments. Obviously, the drawings in the following description are only some embodiments of the present application. For those skilled in the art, without creative work, other drawings can be obtained based on these drawings.

DESCRIPTION OF SPECIFIC EMBODIMENTS OF THE INVENTION

Figure 1:
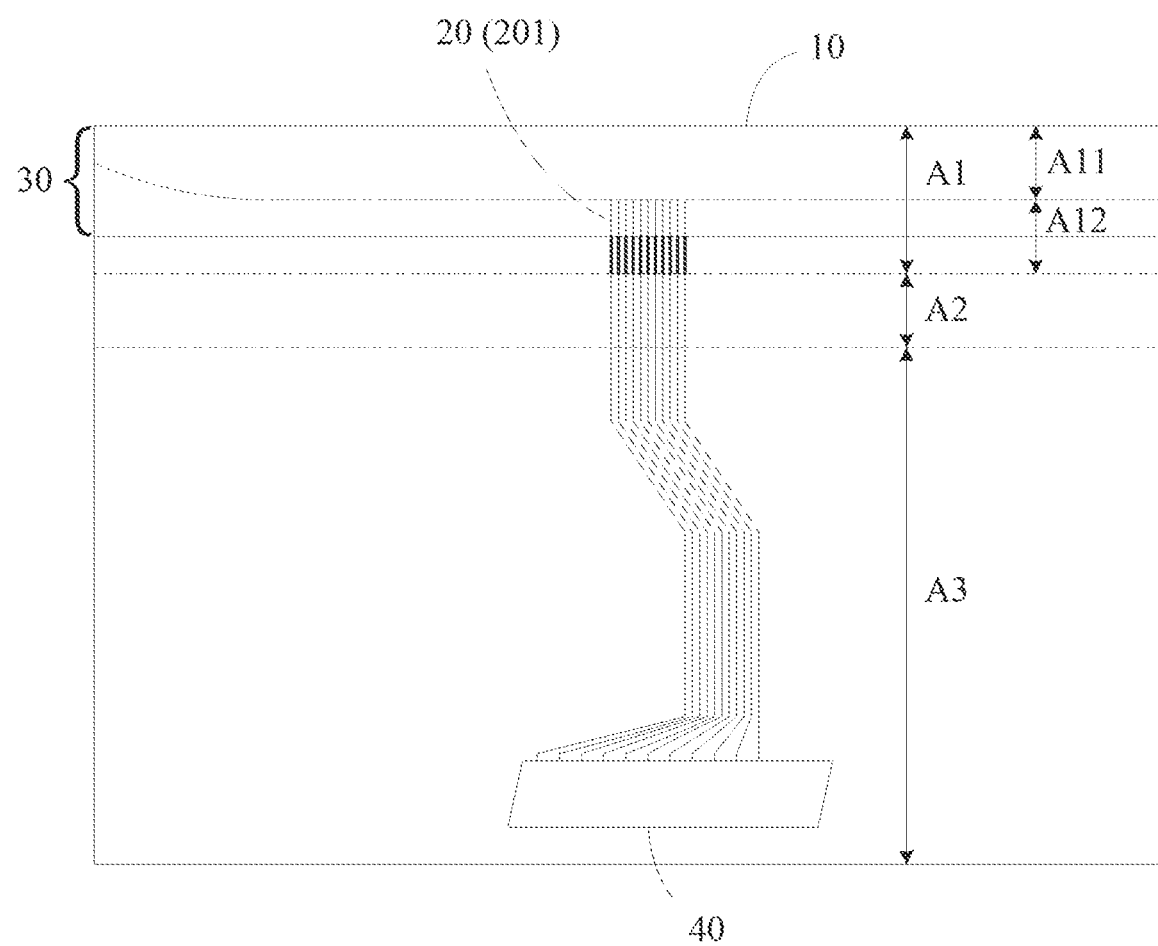
FIG. 1 is a top view of a display module provided by an embodiment of the present application.

The technical solutions in the embodiments of the present application will be clearly and completely described below in conjunction with the drawings in the embodiments of the present application. In the drawings, for clarity and ease of understanding and description, the sizes and thicknesses of the components shown in the drawings are not to scale.

Figure 2:
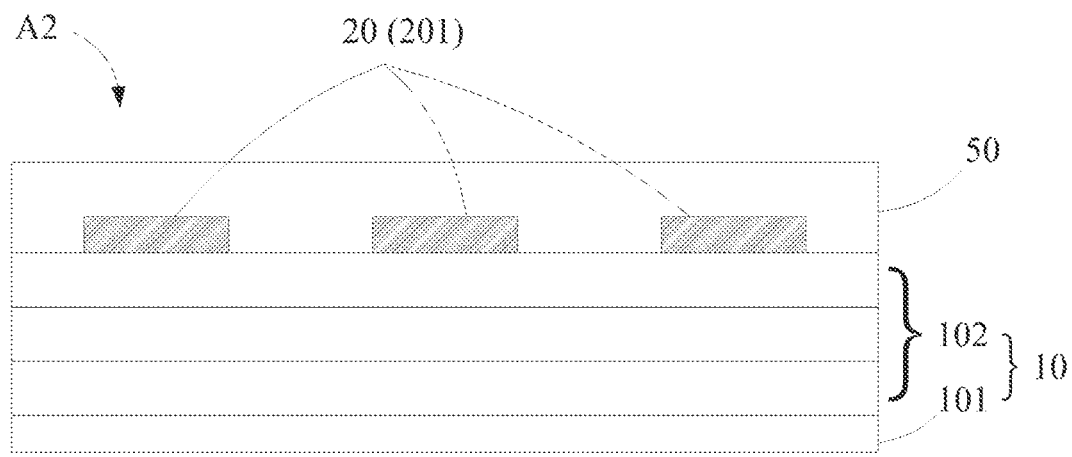
FIG. 2 is a cross-sectional view of the display module in a bending region provided by the embodiment of the present application.

Please refer to FIG. 1 and FIG. 2, which respectively show a top view of a display module provided by an embodiment of the present application and a cross-sectional view of the display module in a bending region provided by the embodiment of the present application. The display module includes a display region A1, a bending region A2, and a binding region A3, and the bending region A2 is located between the display region A1 and the binding region A3. The display module includes a display panel 10 and a touch layer 20. The touch layer 20 is located on a light emitting side of the display panel 10, wherein the touch layer 20 includes a plurality of touch traces 201, and the plurality of touch traces 201 extend form the display region A1 to the bending region A2, and the plurality of touch traces 201 extend across the bending region A2 to the binding region A3.

It should be noted that FIG. 1 is a schematic diagram of the display module in a flattened state. The binding region A3 is bent to the back of the display region A1 through the bending region A2, so that the border of the display module can be reduced. In addition, the display region A1 includes a light emitting region A11 of the display panel 10 and a border region A12 of the display panel 10.

In one embodiment, the display module further includes an encapsulation layer 30 located in the display region A1, and the encapsulation layer 30 is located between the display panel 10 and the touch layer 20. Specifically, the display panel 10 is a flexible display panel, including an organic light emitting layer (not shown). Vapor or oxygen in the air invades into the organic light emitting layer, which may easily cause the aging of the light emitting material or a poor display performance. Therefore, it needs to dispose the encapsulation layer 30 on the display panel 10 to prevent the intrusion of water and oxygen in the air. In addition, an encapsulation boundary of the encapsulation layer 30 is located in the border region A12.

Figure 3:
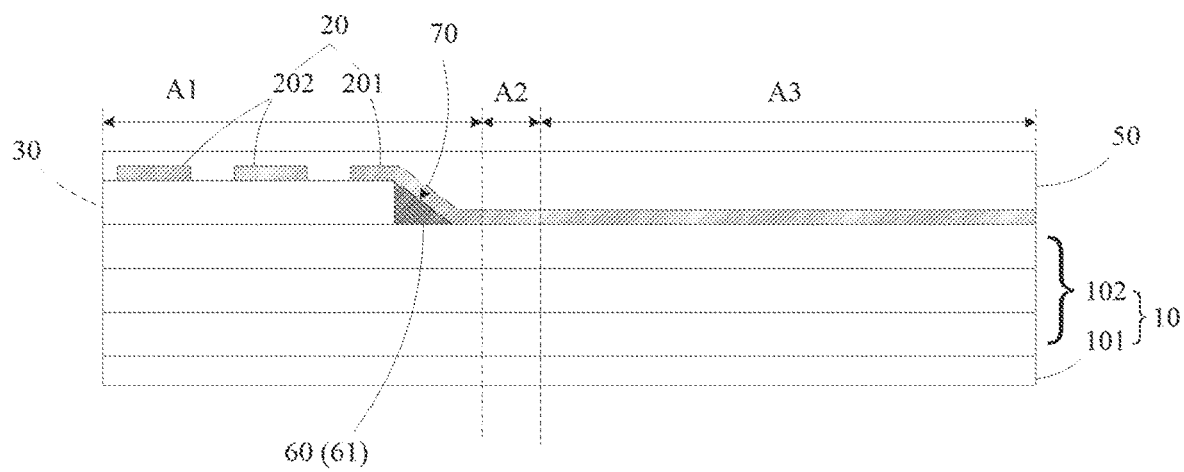
FIG. 3 is a side view of the display module provided by the embodiment of the present application.

It should be noted that the touch layer 20 further includes a plurality of touch electrodes 202 (as shown in FIG. 3) located in the display region A1. The plurality of touch electrodes 202 are electrically connected to the flexible circuit board 40 located in the bending region A3 through the plurality of touch traces 201, and the plurality of touch traces 201 are used to transmit touch electrical signals.

It should be understood that, in the exist technology, the touch traces in the light emitting region A11 are jumped to the array layer of the display panel 10 through jumping holes which are punched in the border region, and then the touch traces are routed through the array layer. After the touch traces extend across the bending region A2, the touch traces are jumped to the touch layer through other jumping holes, to prevent the touch traces from breaking. However, under the design trend of narrowing the border region A12, the encapsulation layer 30 inevitably covers the jumping holes in the border region A12. That results the jumping performance is undesirable, and it is hard to take into account the encapsulating performance and the conduction performance at this location. In the present application, the jumping holes are canceled, the jumping of the touch traces 201 is not implemented in the bending region A2, the touch traces directly extend form the display region A1 to the bending region A2, and the touch traces extend across the bending region A2 to the binding region A3, which prevent a poor jumping performance causing from the jumping holes be covered by the encapsulation layer 30. In addition, the encapsulation reliability can be enhanced, and the process difficulty can be reduced. In response to the border region A12 is narrowed, the encapsulation layer can be disposed further adjacent to the bending region A2, regardless of the conduction problem of the jumping holes, thereby increasing the screen-to-body ratio and realizing a narrow border design. The present application is also suitable for full screen products.

It should be noted that, in this embodiment, the jumping holes in the border region A12 and the binding region A3 are all canceled, the touch layer are used to route the touch traces in the display region A1, the bending region A2, and the binding region A3. The touch traces 201 are bound by disposing the flexible circuit board 40 in the binding region A3. In other embodiment, the jumping holes in the binding region A3 are reserved, only the jumping holes in the border region A12 are canceled. The jumping of the touch traces 201 is not implemented in the bending region A2, after the touch traces extend across the bending region A2, jumping of the touch traces 201 is implemented in the binding region A3. The touch traces in the touch layer 20 are jumped to the array layer of the display panel 10. The touch traces share a driver chip with the display panel 10. The touch layer 20 does not need to be additionally provided with a driver chip, that is, one driver chip can be saved.

It should be noted that the solution of canceling the jumping in this embodiment is not only applicable to the touch trace 201, but also applicable to other metal conductive layers (not shown) on the encapsulation layer 30. In addition, the touch trace 201 and other metal conductive layers on the encapsulation layer 30 can be connected to the display region A1 and the binding region A3 through any position of the bending region A2. The touch traces 201 and other metal conductive layers on the encapsulation layer 30 are alternately arranged in the bending region A2.

In one embodiment, the touch traces 201 is made of a soft material of metal, such as titanium, aluminum, etc., which can reduce the risk of bending and breaking the traces.

In one embodiment, as shown in FIG. 2, in the bending region A2, the display panel 10 includes a flexible substrate 101 and a group of organic film layers 102, the group of organic film layers 102 is located on the flexible substrate 101; wherein the plurality of touch traces 201 are located on the group of organic film layers 102, and a side of the plurality of touch traces 201 being away from the group of organic film layers 1022 is covered by a protective layer 50. It should be understood that, in this embodiment, the touch traces 201 can be prevented from being scratched, and the risk of breaking the traces in the bending region A2 can be reduced, by covering the protective layer 50 on the multiple touch wires 201. Specifically, in this embodiment, the protective layer 50 completely covers the gap between the touch trace 201 and the touch trace 201. In other embodiments, the protective layer 50 may further includes a plurality of protective sub-layers (not shown), wherein one of the plurality of protective sub-layers correspondingly covers one of the plurality of touch traces 201.

Please refer to FIG. 1, in one embodiment, in a top-view direction of the display module, a width of the touch trace 201 located on a side of the encapsulation layer 30 adjacent to the bending region A2 is greater than a width of the touch trace 201 located on the encapsulation layer 30. It should be understood that because the encapsulation boundary of the encapsulation layer 30 is located in the border region A12, that is, there is an encapsulation layer 30 on the side of the border region A12 adjacent to the light emitting region A11, and there is no encapsulation layer 30 on the side of the border region A12 adjacent to the bending region A2. Therefore, there is a step at the encapsulation boundary of the encapsulation layer 30. In this embodiment, the width of the touch trace 201 located on the side of the encapsulation layer 30 adjacent to the bending region A2 is set to be greater than the width of the touch trace 201 located on the encapsulation layer 30, such that the touch trace 201 at the step of the encapsulation layer 30 is widened to reduce the step and reduce the risk of breaking the traces.

In one embodiment, the touch trace 201 located on the side of the encapsulation layer 30 adjacent to the bending region A2 can arranged in a zigzag form to reduce the step and reduce the risk of breaking the traces.

Next, please refer to FIG. 3, FIG. 3 is a side view of the display module provided by the embodiment of the present application. The display module includes a display region A1, a bending region A2, and a binding region A3, and the bending region A2 is located between the display region A1 and the binding region A3. The display module includes a display panel 10 and a touch layer 20, and the touch layer 20 is located on a light emitting side of the display panel 10. The touch layer 20 includes a plurality of touch electrodes 202 and a plurality of touch traces 201, and the plurality of touch traces 201 extend form the display region A1 to the bending region A2, and the plurality of touch traces 201 extend across the bending region A2 to the binding region A3. The touch layer 20 includes a plurality of touch traces 201, and the plurality of touch traces 201 extend form the display region A1 to the bending region A2, and the plurality of touch traces 201 extend across the bending region A2 to the binding region A3. In addition, an elevation layer 60 is disposed on a side of the encapsulation layer 30 adjacent to the bending region A2, a side of the elevation layer 60 adjacent to the touch layer 20 has a buffer structure 70, one end the buffer structure 70 is in contact with a side surface of the encapsulation layer 30 away from the display panel 10, and another end of the buffer structure 70 is in contact with a surface of the group of organic film layers 102 away from the flexible substrate 101.

It should be understood that because the encapsulation boundary of the encapsulation layer 30 has a step on the side adjacent to the bending region A2, there is a risk of breaking the traces. In this embodiment, the elevation layer 60 is disposed on the side of the encapsulation layer 30 adjacent to the bending region A2, a side of the elevation layer 60 adjacent to the touch layer 20 has the buffer structure 70, and the buffer structure 70 connects the upper surface of the encapsulation layer 30 and the upper surface of the group of organic film layers 102. When the touch traces 201 pass through the step at the encapsulation boundary of the encapsulation layer 30, the gradient of the step becomes smoother due to the effect of the buffer structure 70, thereby reducing the risk of breaking the traces. In FIG. 3, the buffer structure 70 is an inclined surface. In other embodiments, the buffer structure 70 may also be an arc surface.

In one embodiment, the elevation layer 60 is made of a non-conductive material. Specifically, because the elevation layer 60 is made of a non-conductive material, the elevation layer 60 can be prepared together with the support post PS (not shown) of the display region A1. In this way, no interference will be caused to the electrical signal of the touch traces 201, and no short circuit will occur. Therefore, no patterning is required.

In one embodiment, the elevation layer 60 is made of a conductive material, and the elevation layer 60 includes a plurality of elevation portions 61 arranged in insulation, and one of the plurality of elevation portions 61 is corresponding to one of the plurality of touch traces 201. It should be understood that when the elevation layer 60 is made of a conductive material, in order to prevent the signals between the touch traces 201 from shorting, the elevation layer 60 is divided into the plurality of elevation portions 61 arranged in insulation, and one elevation portions 61 is arranged corresponding to one touch traces 201, in this embodiment. In this way, the touch trace 201 is widened in the longitudinal direction, which can fill the step caused by the encapsulation boundary of the encapsulation layer 30 and reduce the risk of breaking the traces.

Figure 4:
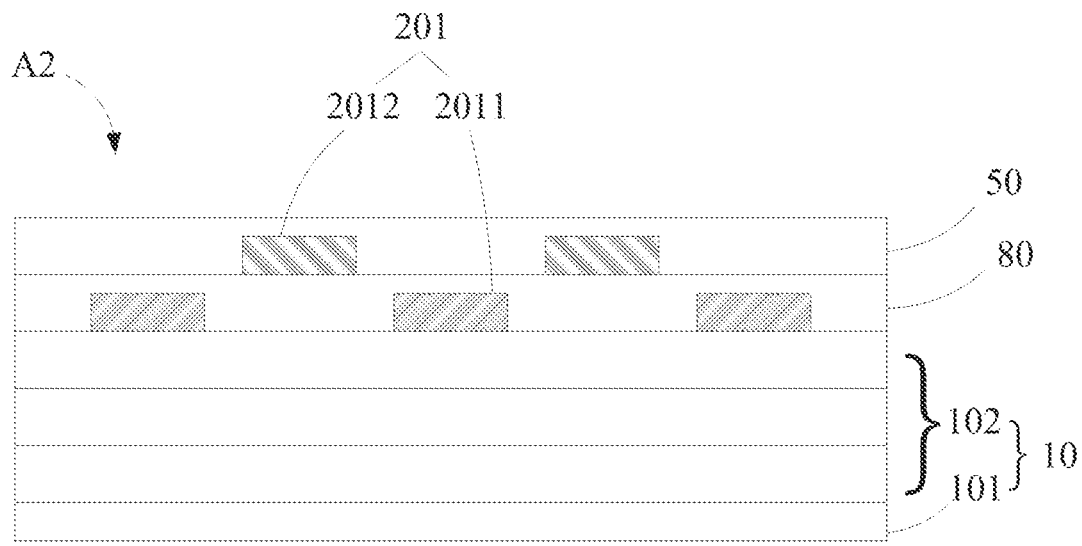
FIG. 4 is a cross-sectional view of another display module in the bending region provided by an embodiment of the present application.

Next, please refer to FIG. 4, FIG. 4 is a cross-sectional view of another display module in the bending region provided by an embodiment of the present application. The display module includes a display region A1, a bending region A2, and a binding region A3, and the bending region A2 is located between the display region A1 and the binding region A3. The display module includes a display panel 10 and a touch layer. The touch layer is located on a light emitting side of the display panel 10, wherein the touch layer includes a plurality of touch traces 201, and the plurality of touch traces 201 extend form the display region A1 to the bending region A2, and the plurality of touch traces 201 extend across the bending region A2 to the binding region A3.

In this embodiment, the plurality of touch traces 201 include a plurality of first touch traces 2011 and a plurality of second touch traces 2012, and the plurality of first touch traces 2011 and the plurality of second touch traces 2012 are disposed in different layers. It should be noted that, in this embodiment, the touch traces 201 is arranged in two layers as an example for description. In other embodiments, the touch traces 201 can also be divided into three layers, four layers or more.

In one embodiment, in the bending region A2, each of the plurality of first touch traces 2011 is located between the adjacent two second touch traces 2012, and each of the plurality of second touch traces 2012 is located between the adjacent two first touch traces 2011. It should be understood that, in this embodiment, the plurality of touch traces 201 are divided into the plurality of first touch traces 2011 and the plurality of second touch traces 2012, and the plurality of first touch traces 2011 and the plurality of second touch traces 2012 are alternately arranged. In this way, the bending stress between the first touch trace 2011 and the second touch trace 2012 can be balanced to prevent the breaking caused by excessive local stress resulting from uneven distribution of the touch trace 201.

In one embodiment, in the bending region A2, an insulating layer 80 is disposed between the plurality of first touch traces 2011 and the plurality of second touch traces 2012.

Figure 5:
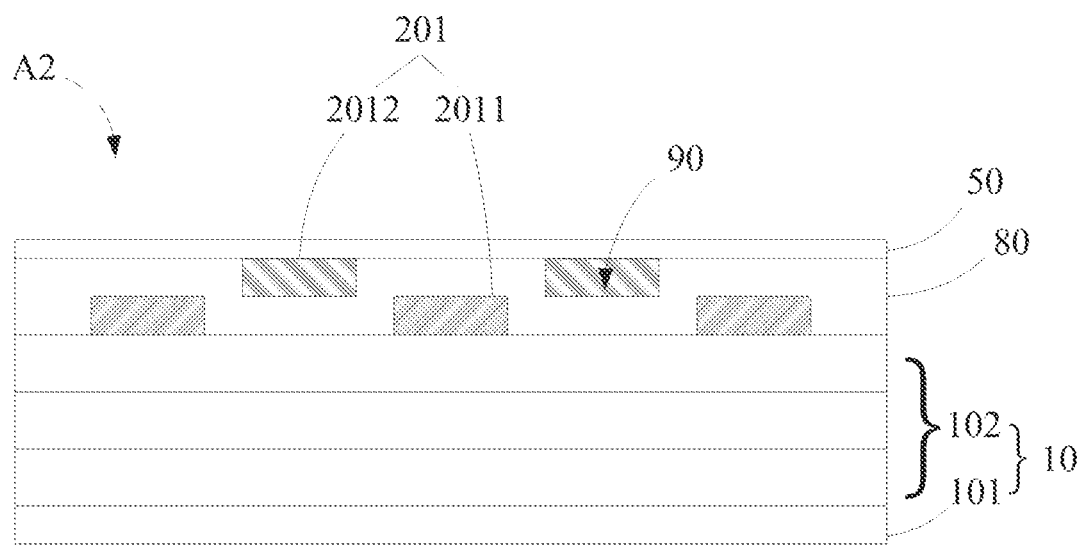
FIG. 5 is a cross-sectional view of yet another display module in the bending region provided by an embodiment of the present application.

Next, please refer to FIG. 5, FIG. 5 is a cross-sectional view of yet another display module in the bending region provided by an embodiment of the present application. The display module includes a display region A1, a bending region A2, and a binding region A3, and the bending region A2 is located between the display region A1 and the binding region A3. The display module includes a display panel 10 and a touch layer. The touch layer is located on a light emitting side of the display panel 10, wherein the touch layer includes a plurality of touch traces 201, and the plurality of touch traces 201 extend form the display region A1 to the bending region A2, and the plurality of touch traces 201 extend across the bending region A2 to the binding region A3.

In this embodiment, the plurality of touch traces 201 include a plurality of first touch traces 2011 and a plurality of second touch traces 2012, and the plurality of first touch traces 2011 and the plurality of second touch traces 2012 are disposed in different layers. In the bending region A2, each of the plurality of first touch traces 2011 is located between the adjacent two second touch traces 2012, and each of the plurality of second touch traces 2012 is located between the adjacent two first touch traces 2011.

In one embodiment, in the bending region A2, an insulating layer 80 is disposed between the plurality of first touch traces 2011 and the plurality of second touch traces 2012, and the plurality of first touch traces 2011 are located between the display panel 10 and the plurality of the second touch traces 2012, wherein a side of the insulating layer 80 away from the plurality of first touch traces 2011 has a plurality of grooves 90, and the plurality of second touch traces 2012 are respectively disposed in the plurality of grooves 90. It should be understood that in this embodiment, the groove 90 is defined on the side of the insulating layer 80 away from the first touch trace 2011, and the second touch trace 2012 is disposed in the grooves 90. In this way, it not only can balance the bending stress between the first touch trace 2011 and the second touch trace 2012, but also can reduce the thickness of the display module, thereby making the display module lighter and thinner.

The embodiment of the present application further provides a display terminal, the display terminal includes a terminal body and the above-mentioned display module. The terminal body and the display module are combined into one body. The basic structure of the display module may refer to the related descriptions of FIG. 1 to FIG. 5, and they will not be repeated here. The display terminal provided by the embodiment of the present application may be a product or component with a display function such as a mobile phone, a tablet computer, a notebook computer, a television, a digital camera, a navigator, and the like.

In summary, the embodiment of the present application provides a display module including a display region, a bending region, and a binding region, and the bending region is located between the display region and the binding region. The display module includes a display panel and a touch layer. The touch layer is located on a light emitting side of the display panel, wherein the touch layer includes a plurality of touch traces, and the plurality of touch traces extend form the display region to the bending region, and the plurality of touch traces extend across the bending region to the binding region. In the present application, the jumping holes are canceled, the jumping of the touch traces is not implemented in the bending region, the touch traces directly extend form the display region to the bending region, and the touch traces extend across the bending region to the binding region, which prevent a poor jumping performance causing from the jumping holes be covered by the encapsulation layer. In addition, the encapsulation reliability can be enhanced, and the process difficulty can be reduced. Moreover, the encapsulation layer can be disposed further adjacent to the bending region, regardless of the conduction problem of the jumping holes, thereby increasing the screen-to-body ratio and realizing a narrow border design. The present application solves the technical problem that the jumping of the touch traces is implemented through the jumping holes in the bending region which results the encapsulating performance and the conduction performance of signal cannot be taken into account, in the exist technology.

What is claimed is:

1. A display module, including a display region, a bending region, and a binding region, the bending region located between the display region and the binding region, the display module comprising:
   a display panel;
   a touch layer located on a light emitting side of the display panel, wherein the touch layer includes a plurality of touch traces, and the plurality of touch traces extend form the display region to the bending region, and the plurality of touch traces extend across the bending region to the binding region;
   an encapsulation layer located in the display region, wherein the encapsulation layer is located between the display panel and the touch layer; wherein
   in a top-view direction of the display module, a width of the touch trace located on a side of the encapsulation layer adjacent to the bending region is greater than a width of the touch trace located on the encapsulation layer; and wherein
   in the bending region, the display panel comprises a flexible substrate and a group of organic film layers, the group of organic film layers is located on the flexible substrate; wherein the plurality of touch traces are located on the group of organic film layers, and a side of the plurality of touch traces being away from the group of organic film layers is covered by a protective layer.

2. The display module according to claim 1, wherein the protective layer comprises a plurality of protective sub-layers, and one of the plurality of protective sub-layers correspondingly covers one of the plurality of touch traces.

3. The display module according to claim 1, wherein the plurality of touch traces comprise a plurality of first touch traces and a plurality of second touch traces, and the plurality of first touch traces and the plurality of second touch traces are disposed in different layers.

4. The display module according to claim 3, wherein, in the bending region, each of the plurality of first touch traces is located between two adjacent ones of the plurality of second touch traces, and each of the plurality of second touch traces is located between two adjacent ones of the plurality of first touch traces.

5. The display module according to claim 4, wherein, in the bending region, an insulating layer is disposed between the plurality of first touch traces and the plurality of second touch traces, and the plurality of first touch traces are located between the display panel and the plurality of the second touch traces;
   wherein a side of the insulating layer away from the plurality of first touch traces has a plurality of grooves, and the plurality of second touch traces are respectively disposed in the plurality of grooves.

6. A display terminal, including a terminal body and a display module, the terminal body and the display module combined into one body, the display module including a display region, a bending region, and a binding region, the bending region located between the display region and the binding region, the display module comprising:
- a display panel;
- a touch layer located on a light emitting side of the display panel, wherein the touch layer includes a plurality of touch traces, and the plurality of touch traces extend form the display region to the bending region, and the plurality of touch traces extend across the bending region to the binding region;
- an encapsulation layer located in the display region, wherein the encapsulation layer is located between the display panel and the touch layer; wherein
- in a top-view direction of the display module, a width of the touch trace located on a side of the encapsulation layer adjacent to the bending region is greater than a width of the touch trace located on the encapsulation layer; and wherein
- in the bending region, the display panel comprises a flexible substrate and a group of organic film layers, the group of organic film layers is located on the flexible substrate; wherein the plurality of touch traces are located on the group of organic film layers, and a side of the plurality of touch traces being away from the group of organic film layers is covered by a protective layer.

7. The display terminal according to claim 6, wherein the protective layer comprises a plurality of protective sub-layers, and one of the plurality of protective sub-layers correspondingly covers one of the plurality of touch traces.

8. The display terminal according to claim 6, wherein the plurality of touch traces comprise a plurality of first touch traces and a plurality of second touch traces, and the plurality of first touch traces and the plurality of second touch traces are disposed in different layers.

9. The display terminal according to claim 8, wherein, in the bending region, each of the plurality of first touch traces is located between two adjacent ones of the plurality of second touch traces, and each of the plurality of second touch traces is located between two adjacent ones of the plurality of first touch traces.

10. The display terminal according to claim 9, wherein, in the bending region, an insulating layer is disposed between the plurality of first touch traces and the plurality of second touch traces, and the plurality of first touch traces are located between the display panel and the plurality of the second touch traces;

wherein a side of the insulating layer away from the plurality of first touch traces has a plurality of grooves, and the plurality of second touch traces are respectively disposed in the plurality of grooves.

\* \* \* \* \*